United States Patent [19]

Pfluger

[11] Patent Number: 4,949,704
[45] Date of Patent: Aug. 21, 1990

[54] SOLAR COLLECTOR FOR THE GENERATION OF HIGH TEMPERATURE

[75] Inventor: Antonio Pfluger, Bonn, Fed. Rep. of Germany

[73] Assignee: Forshung e.V. Fraunhofer-Gesellschaft zur Forderung der angewandten, Munich, Fed. Rep. of Germany

[21] Appl. No.: 383,204

[22] Filed: Jul. 21, 1989

[30] Foreign Application Priority Data

Jul. 21, 1988 [DE] Fed. Rep. of Germany ........ 3824759

[51] Int. Cl.$^5$ ................................................ F24J 3/02
[52] U.S. Cl. ...................................... 126/441; 126/450
[58] Field of Search ............... 126/441, 442, 450, 417, 126/901

[56] References Cited

U.S. PATENT DOCUMENTS

| | | | |
|---|---|---|---|
| 3,916,871 | 11/1975 | Ester et al. ............................ | 126/450 |
| 4,019,496 | 4/1977 | Cummings ............................ | 126/441 |
| 4,149,522 | 4/1979 | Keeling ................................ | 126/441 |
| 4,334,524 | 6/1982 | McCullough et al. ............... | 126/441 |
| 4,791,910 | 12/1988 | Ishid et al. ........................ | 126/441 X |

*Primary Examiner*—Larry Jones
*Attorney, Agent, or Firm*—Jeffers, Hoffman & Niewyk

[57] ABSTRACT

A solar collector for the generation of high temperatures including a tub-like housing defining a cavity, a glass plate for sealingly closing the cavity, a selective absorber and a trasparent thermal insulation structure located on the inside of the glass plate. An air gap separates the selective absorber from the glass plate. The solar collector is operated at a vacuum of less than 10000 pascal by means of a vacuum pump. The transparent thermal insulating member reduces the air convection and acts similarly to a mulitple pane for the reflected, diffuse thermal radiation. High efficiencies are thus achievable even at large temperature difference between the absorber and the area outside the solar collector. The thermal insulation effect of the air gap and at the same time of the microporous thermal insulation located in the bottom of the housing is varied by regulation of the degree of vacuum. A higher air pressure results in greater thermal losses of the absorber toward the thermal insulation member and the microporous insulation, whereby the temperature of the absorber is controllable.

13 Claims, 4 Drawing Sheets

SOLAR COLLECTOR FOR THE GENERATION OF HIGH TEMPERATURE

BACKGROUND OF THE INVENTION

The invention concerns a solar collector for the generation of high temperatures, with a housing tub, a glass plate sealing the solar collector and a selective absorber, with a vacuum prevailing in the cavity of the solar collector.

Concerned in the case of the solar collector for the generation of high temperatures is a solar collector which is operated at large temperature differences between the absorber, for one, and the area outside the solar collector for another.

It is previously known to use solar collectors for gaining energy, specifically thermal energy for the heating of liquids. In doing so, the incident sunlight falls on a black absorber which to approximately 95% converts the incident light energy to heat. A fluid flowing through the black absorber transports the thermal energy to a place where it is stored or used.

On the side away from the incident sunlight, the black absorber is thermally well insulated. On the side of the solar collector facing toward the sun, the insulation against thermal losses is more difficult to realize. In most flat collectors, losses occur through convection of the air contained in the solar collector and through infrared radiation of the hot absorber. Known from the company catalog of thermo-solar Energietechnik GmbH 6/87 is a solar collector which on its side facing toward the sun features a glass plate. The incident sunlight is unimpeded and the thermal reflection emanating from the absorber is extensively prevented by the glass plate from exiting. For a simple glass plate, 25% retransmission must be expected for the thermal reflection, which is lost in terms of heat generation.

While double glazing reduces the thermal loss by retransmission further, the transmission for the incident sunlight is worsened. With each interjected additional glass plate, the efficiency of the solar collector is reduced more than what is gained by reduction of thermal losses.

Therefore, the heat transfer between the absorber and the exterior of the solar collector, through the glass plate, has already been reduced in other ways. Described in Solar Collector by W. B. Gillette and J. E. Moon, D. Reidel Publishing Company (1985), for the solar energy R & D in the European community (Series A, Volume 6) is the effect of a selective black absorber. A selective black absorber is absorbent to the incident sunlight and highly reflective for the thermal radiation produced in the absorber. The heat radiation to the outer glass is thereby reduced by 90%.

But especially in the high temperature range above 100° C. temperature difference between absorber and the area outside the solar collector, the efficiencies accomplished with these improvements are still very low.

A remedy is offered by high-vacuum solar collectors such as known from Applied Solar Energy by A. B. and M. P. Meinel (Addison-Wesley, 1977). Here, the selective absorber is melted into a highly evacuated glass tube. The evacuated space between the absorber and the cover glass avoids any convection of air and heat transmission by the air, thus increasing the efficiency. At the addressed temperature differences of more than 100° C., efficiencies of 50% to 60% are achievable. The use of a high vacuum is disadvantageous since the integrity of the vacuum must be maintained over the entire operating time. This makes high-vacuum solar collectors very expensive to operate and difficult to handle.

Another possibility of solution is known again from the company catalog of thermo-solar Energietechnik GmbH 6/87. Here, the cavity between the outer glass plate and the selective absorber is evacuated lightly so as to reduce the convection of the air in the solar collector. High efficiencies have already been achieved thereby, but the efficiency continues to drop greatly especially at great temperature differences between the area outside the solar collector and the absorber.

The article "Minimum Thermal Conductivity of Transparent Insulation Materials" by A. Pfluger in Solar Energy Materials 16, p. 255–265 (1987) examined theoretically the thermal conductivity of thermal insulation materials that are transparent to light radiation.

Described in the German patent disclosures 28 35 371 and 28 35 372 each is a solar heater where honeycomb type thermal insulating materials or such formed by tubelets are attached to the covering glass plate. The transparent thermal insulation on the inside of the glass plate suppresses the air convection and thermal radiation. Known from the German patent disclosure 28 23 449 is another solar heater for the heating of gases where the above honeycomb structure is translucent or totally reflective.

The German patent disclosure 27 40 448 describes the use of foam glass as insulation and construction material for solar collectors.

The German patent disclosure 31 50 251 teaches a solar collector with an evacuated interior whose cover plate is supported against thermal and compressive loads with the aid of support plates that are impermeable to radiation.

The thermal losses in such systems are often reduced by an additional air gap between the selective absorber and the honeycomb structure. This reduces the risk of damage through high temperatures. However, there are limits to the width of the air gap and, thus, the reduction of thermal losses: depending on temperature, convection of air sets in at a gap width of a few centimeters.

Basing on this prior art, the problem underlying the invention is to provide a solar collector of the initially mentioned type that has a high efficiency at large temperature differences between the absorber, for one, and the area outside the solar collector, for another.

SUMMARY OF THE INVENTION

This problem is inventionally solved in that a transparent insulating structure is fastened in sealing fashion on the inside of the glass plate.

A transparent honeycomb structure of thermal insulating material on the glass plate used as a cover is extensively transparent to the directionally incident sunlight and is as effective as a cover consisting of very few glass plates. Nonetheless, the effectiveness of the transparent honeycomb structure in terms of the diffusely reflected thermal radiation corresponds to a glass cover consisting of many glass plates. The diffuse, thermal reflection emanating from the selective absorber has many radiation components that are reflected transversely to the incident sunlight Thus, these components of reflection traverse many honeycomb cells.

Moreover, the cells of the thermal insulation honeycomb structure form with their sidewalls narrow channels with a closed end, so that no air convection can occur.

The air convection is greatly suppressed by a large ratio between the length of the honeycomb cells and their diameter, since the end of a honeycomb cell is attached in sealing fashion to the outer glass plate Using for support of the covering glass plato, relative to the vacuum, support rings that extend in a plane transverse to the glass plate makes it possible to reduce the number of props supporting the glass plate. The heat dissipation through the props can be greatly reduced thereby. It is also possible to design the absorber and props in such a way that they will not make mutual contact.

An operating vacuum of 2000 to 5000 pascal allows the use of simple piston pumps for evacuating the solar collector. With the referenced gas pressures, microporous thermal insulation material is characterized by an extremely low thermal conductivity. Since the thermal conductivity rises with the air pressure, the air pressure regulation within the solar collector can be utilized for temperature control.

BRIEF DESCRIPTION OF THE DRAWINGS

Three embodiments of the invention will be more fully explained hereafter with the aid of the drawings.

DESCRIPTION OF THE PREFERRED EMBODIMENT

Figure 1:
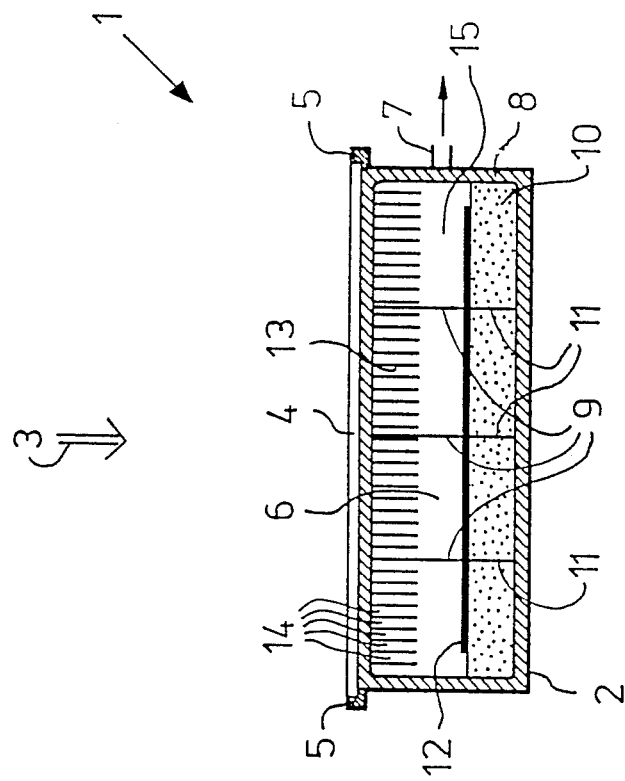
FIG. 1 shows a cross section of a solar collector according to a first embodiment of the invention.

FIG. 1 shows a solar collector 1 according to a first embodiment of the invention, in cross section. The solar collector 1 features a housing tub 2 which preferably is drawn seamless and whose length and width is large relative to its height. It may consist, e.g., of steel or other material specified for the atmosphere at the application site of the solar collector 1. The housing tub 2 is upwardly essentially open, so that the directionally incident sunlight 3 can enter unhindered through the upper opening.

The open side of the solar collector 1 facing toward the incident sunlight 3 is covered with a glass plate 4, which at its transition points 5 is glued to the housing tub 2. Other sealing methods, for instance glass/metal transitions, may be used as well for the marginal connection of the glass plate 4 and the housing tub 2. The glass plate 4 consists of glass that is as low as possible in iron content in order to keep the absorption losses of the incident sunlight 3 in the glass plate 4 low, and it can be prestressed for safety reasons.

By sealing the open side of the housing tub 2 facing the incident sunlight 3, with the glass plate 4, a cavity 6 is created.

On a length side of the solar collector 1, a vacuum socket is fitted in the housing tub 2 and connected through a vacuum hose with a vacuum pump not illustrated in FIG. 1. The vacuum pump evacuates the cavity defined by the housing tub 2, for one, and by the glass plate 4, for another, to a pressure of about 2000 to 5000 pascal. This operating pressure can be produced and maintained by a simple piston pump.

An operating pressure of 2000 to 5000 pascal represents a load to the housing structure of the solar collector 1, specifically to the glass plate 4. To reduce the load of the air pressure acting from outside on the structure, support members 8 are provided, of which one is illustrated in cross section in FIG. 1. The use of support members 8 makes it possible to greatly reduce the number of additionally used vacuum props 9, whereby the thermal loss occurring through thermal radiation in the support elements is greatly reduced.

The bottom of the housing tub 2 is lined with a microporous insulating material 10 which reduces thermal losses in the direction of the side of the solar collector away from the incident sunlight 3. Microporosity means here that the pores have a considerably smaller diameter than the mean free length of travel of air molecules at the above stated air pressure. The mean free length of travel of the air molecules at this vacuum is in the micrometer range. The thermal insulation effect is considerably improved thereby. The thickness of the microporous thermal insulation layer 10 has been so selected that the insulation of the solar collector 1 in the direction of the side away from the incident sunlight 3 is considerably better than the insulation on the side facing the sun. Some microporous thermal insulation materials 10 are capable of absorbing the vacuum pressure, so that the sections 11 of the vacuum props 9 drawn in FIG. 1 are dispensable, which has a favorable effect on the thermal conductivity losses through the frame structure of the solar collector 1.

Arranged on the microporous thermal insulation material 10 is a selective absorber 12 which converts the incident sunlight 3 to heat. The fluid which is necessary for the heat transport and flows through fluid channels on or in the absorber 12, including its feed and drain lines to and from the solar collector 1, has been omitted from the drawing for the sake of clarity. The selective absorber 12 features a coating which to the spectrum of the incident sunlight 3 is black, that is, the entire incident sunlight 3 is absorbed by the selective absorber 12. For the wavelength range of the thermal radiation of the selective absorber 12, though, the coating is nearly reflective and thus low in radiation.

On the side of the glass plate 4 facing toward the absorber 12, a transparent honeycomb structure 13 is arranged in the cavity 6 of the solar collector 1, as thermal insulation material. It consists of transparent channels or cells 14 whose diameter is small relative to the length of the honeycomb cells 14. The end of the honeycomb structure 13 that is in contact with the glass plate 4 is connected with it in sealing fashion. Thus, the one end of the honeycomb cells 14 is sealed.

The wall structures of these honeycomb cells 14 are transparent and preferably of polygonal design, for instance quadrates, hexagons or octagons and quadrates. The said three wall structures, cross-sectionally and parallel to the end phases of the honeycomb structure, allow the complete occupation of the cross-sectional area of the honeycomb structure 14 with said polygons. Especially the first two wall structures feature favorably still equally large cross-sectional areas of the cells 14.

The length of the honeycomb structure 13 in the described first embodiment is 10 cm, the diameter of a single cell 14 has been selected so small that an air convection within a cell 14 will be essentially suppressed at the vacuum prevailing in the solar collector 1. Essential for a high efficiency is that the relative apparent density range is below 10% and the thermal radiation length is below 5 cm, preferably below 2 cm. The latter corresponds to an optical density of about 0.5 cm$^{-1}$ and greater.

An air gap 15 which is 10 cm wide and extends parallel to the absorber 12 is provided here in the cavity 6, between the underside of the honeycomb structure 13 and the selective absorber 12. Since a low vacuum of about 2000 to 5000 pascal prevails in the solar collector 1, no air convection occurs in the cavity 6, despite providing the air gap 15. The air gap has a width ranging from 5 to 20 cm. Additionally, the transparent honeycomb structure 13 will then, at collector temperatures of 200° C., heat up to only maximally 120° C., that is, to a temperature which will not jeopardize the transparent honeycomb structure 13 consisting of plastic.

Determining the height of the housing tub 2, the stated values for the thickness of the air gap 15 and the transparent honeycomb structure 13 are designed for operating temperatures of 200° C. in the area of the selective absorber 12.

Figure 2:
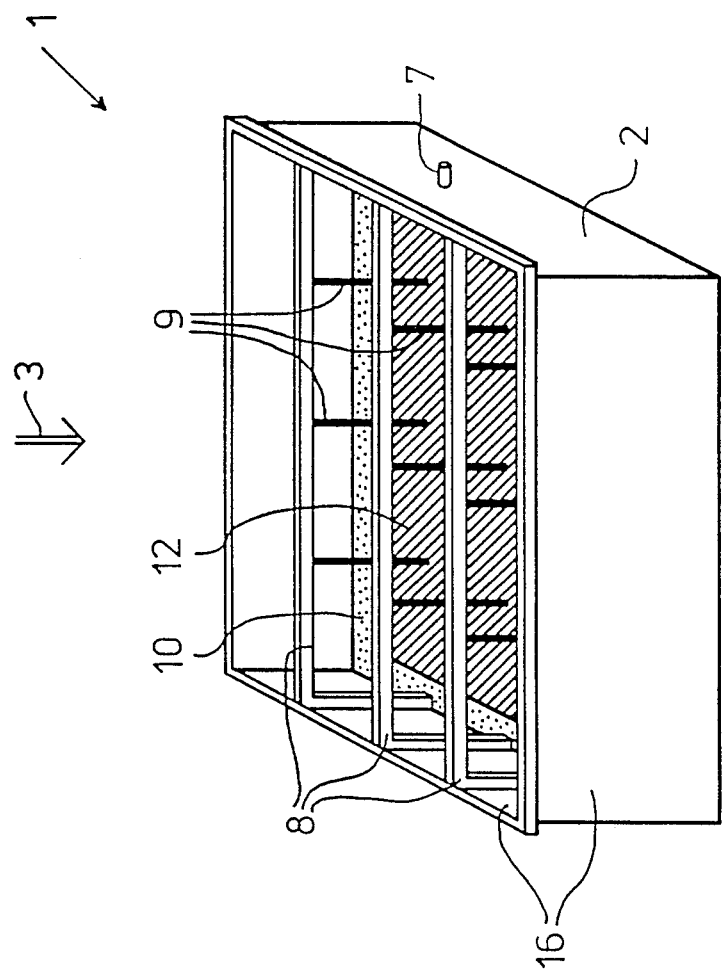
FIG. 2 is a perspective plan view of a solar collector according to the first embodiment of the invention, without its thermal insulation, transparent cover of the solar collector.

FIG. 2 shows a solar collector 1 according to a first embodiment of the invention in a perspective plan view, without its glass plate 4 and without the transparent honeycomb structure 13, in order to elucidate the housing and frame structure. The illustrated solar collector 1 features three support rings 8 whose interior is supported by three vacuum props 9 each. The minimum number of support rings 8 and vacuum props 9 to be used in the cavity 6, for a high stability of the solar collector at the operational prevailing vacuum, varies with the magnitude of the vacuum and the design dimensions of the solar collector 1.

The solar collector 1 is lined with the microporous thermal insulation material 10, which latter is almost completely covered by the selective absorber 12. Especially microporous thermal insulation materials 10 have at the stated gas pressures in the solar collector 1 an extremely low thermal conductivity, but also materials other than microporous thermal insulation 10 can be used for insulation of the solar collector 1, specifically a combination of layers reflecting the thermal radiation and thermal insulation materials.

The materials used on the side away from the incident sunlight 3 may basically be arranged additionally also for lateral thermal insulation on the sidewalls 16 of the solar collector 1, so as to further reduce also the thermal loss through sidewalls 16.

Figure 3:
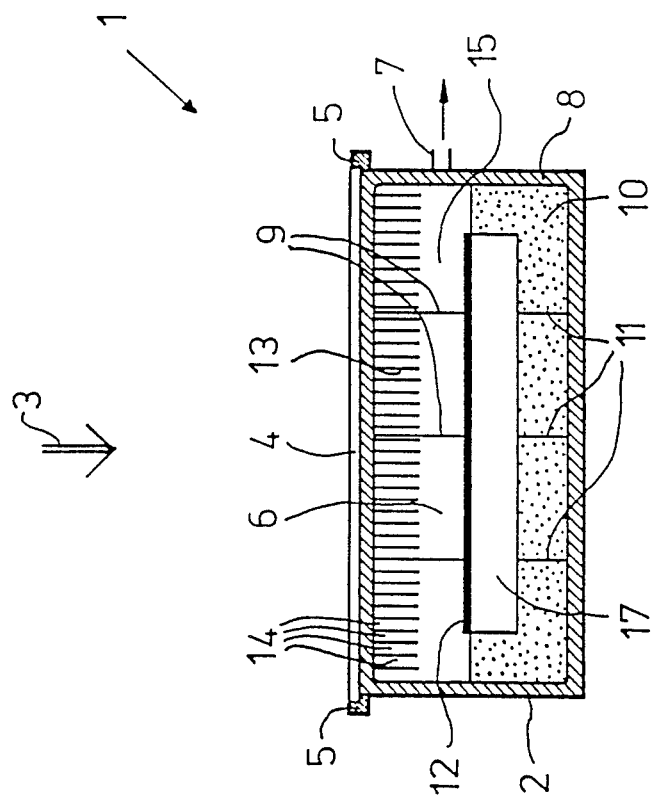
FIG. 3 is a cross section of a solar collector according to a second embodiment of the invention.

FIG. 3 shows a second embodiment of the invention as an integrated store/solar collector 1. The same as in the first embodiment, the housing tub 2 and the glass plate 4 form the cavity 6 that comprises the honeycomb structure 13, the microporous insulation material 10, support rings 8, vacuum prop 9, the vacuum socket and the selective absorber 12. Instead of the fluid channels that exist in the first embodiment in or on the selective absorber 12, a fluid container 17 is arranged in the second embodiment below the selective absorber 12. Lines to the fluid container 17 in the solar collector 1 have been omitted for clarity.

The fluid container 17, which wholly or partly may be integrated in the selective absorber 12, has a large volume. The fluid contained in this volume serves at the same time as heat exchanger and heat reservoir, which due to the good thermal insulation of the solar collector 1 has a favorable effect on the thermal losses of the solar energy system as a whole at times of absent sun radiation.

Figure 4:
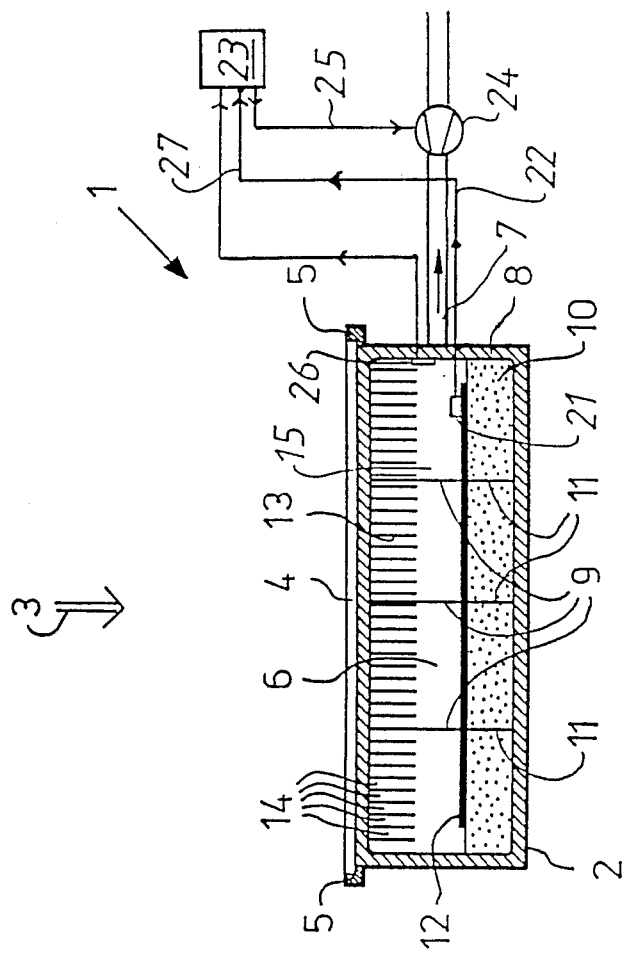
FIG. 4 is a cross section of a solar collector according to a third embodiment of the invention.

FIG. 4 shows a cross section of a solar collector according to a third embodiment of the invention. Connected to the selective absorber 12 is a temperature sensor 21 which monitors the temperature of the absorber surface The resulting temperature signal is sent by way of a connecting line 22 to an electronic control circuit 23

In another embodiment, not illustrated in the drawing, the temperature sensor 21 is attached to the transparent honeycomb structure 13 or is outside the solar collector 1 in contact with a fluid line of the fluid heated in the absorber 12. In these embodiments, too, the temperature of the absorber 12 can be determined in the electronic control circuit 23 from the measured temperature.

Connected to the housing tub 2, which is hermetically sealed from the surroundings, through a vacuum socket 7, is a vacuum pump 24 with the aid of which the normal operating vacuum between about 1000 and 10,000 pascal can be produced. This normal operating vacuum results from an equilibrium of flow which comes about due to the sealing losses of the sealed housing tub 2 to the surroundings.

The electronic control circuit 23 connects through a control line 25 with a vacuum pump 24. Thus, control signals can be sent to the vacuum pump, determining the capacity of the vacuum pump 24. The pump capacity is a direct measure for the pressure prevailing in the cavity 6. Provided in the cavity 6 is favorably a pressure sensor 26 which through a pressure measuring line 27 is connected with the electronic control circuit 23. Thus it is possible to adjust the desired vacuum directly with the aid of the electronic control circuit 23.

The vacuum of less than 1000 pascal effectively prevents the air convection within the cavity 6, for instance for an air gap of more than 10 to 20 cm. The thermal insulation of the absorber against the sides away from the incident sunlight 3 is outstanding when using the microporous thermal insulation 10, since the free length of travel of the air molecules, lying in the micrometer range, is greater than the pore diameter of the microscopic thermal insulation material 10.

The electronic control circuit 23 controls the temperature and thus the efficiency of the solar collector 1. If the temperature rises undesirably, the electronic control circuit 23 reduces by way of the electronic control line 25 the output of the vacuum pump 24, thereby raising the pressure in the solar collector 1. The thermal conductivity rises with the air pressure prevailing in the solar collector 1. The air convection that sets in the cavity 6 lowers the temperature of the selective absorber 12 but increases briefly the temperature of the transparent thermal insulation material 13, which can be destroyed through this temperature increase.

With the inventional lining of the sides of the solar collector 1 away from the incident sunlight 3 using the microporous thermal insulation material 10, also the air pressure in the pores of said material increases and the free length of travel of the air molecules in the pores is reduced to less than the pore diameter, thereby increasing greatly the thermal conductivity of the microporous insulation material 10 and dissipating the excess heat of the absorber 12, specifically also in the direction of the sides away from the incident sunlight 3.

The width of a favorable air gap A is computed from $A = B \times (C^{-1} - 0.5)$, where B is the radiation length of the transparent insulation materials 13, which with the insulation materials used corresponds approximately to the reciprocal of the optical density, and where C is the emissivity of the selective absorber 12. Used as transparent insulation materials 13 are preferably substances with a radiation length of less than 5 cm. The emission degree for thermal radiation of a usual selective absorber amounts to approximately 0.1.

The width of a favorable air gap, with a transparent insulating material 13 having a radiation length of 2 cm, a usual material and a vacuum of 2000 pascal, is about 19 cm.

While this invention has been described as having a preferred design, it will be understood that it is capable of further modification. This application is therefore intended to cover any variations, uses, or adaptations of the invention following the general principles thereof and including such departures from the present disclosure as come within customary practice in the art to which this invention pertains and fall within the limits of the appended claims.

I claim:

1. Solar collector for the generation of high temperatures, said solar collector including a housing, said housing defining a cavity, a glass plate forming a sealing closure for said cavity, a selective absorber disposed in said cavity, said cavity being at least partially evacuated so that it is at lower than atmospheric pressure, a transparent thermal insulation member sealingly secured to the glass plate inside said cavity, said thermal insulation member having a radiation length of less than 5 cm., a gap separating said thermal insulating member and said selective absorber, at least one of the inside walls of said housing having a microporous thermal insulating material disposed thereon, the pores of said microporous material being smaller than the mean free length of travel of air molecules at normal operating pressures in said cavity, and a heat exchange fluid in said cavity.

2. Solar collector according to claim 1, wherein said insulation member comprises a cellular honeycomb member, the cells of said honeycomb member being elongated so that their length is much greater than their diameter.

3. Solar collector according to claim 2, wherein the wall structures of said cells consist of polygons that of equal area.

4. Solar collector according to claim 3 wherein said polygons are hexagons.

5. Solar collector according to claim 3 wherein said polygons are quadrates.

6. Solar collector according to claim 2 wherein the insulation member is glued to said glass plate along the end face of said cells.

7. Solar collector according to claim 1 wherein a support member is provided which supports said glass plate relative to the external air pressure.

8. Solar collector according to claim 1 wherein the pressure in said cavity is less than 10,000 pascal.

9. Solar collector according to claim 1 wherein the pressure in said cavity is between 2000 and 5000 pascal.

10. Solar collector according to claim 1 wherein said heat exchange fluid operates at temperatures in excess of 200° C.

11. Solar collector according to claim 1 wherein said gap has a width which is a function of the radiation length of said transparent thermal insulation member multiplied by the reciprocal of one half the emissivity of said selective absorber.

12. Solar collector according to claim 1 wherein the width of said gap is between 5 cm and 20 cm.

13. Solar collector according to claim 1 including a temperature sensor means for monitoring the temperature of the absorber, said sensor means connected to an input of an electronic control circuit, an output of said electronic control circuit connected to a vacuum pump for evacuating said cavity, whereby said electronic control controls the air pressure in said solar collector and the thermal conductivity of said microporous insulation material.

* * * * *